(12) United States Patent
Asano et al.

(10) Patent No.: US 6,298,878 B1
(45) Date of Patent: Oct. 9, 2001

(54) BALL COCK FOR RAILWAY VEHICLE

(75) Inventors: Yoshio Asano, Kobe; Osamu Akamatsu, Akashi; Mitsumasa Morita, Miki; Yoshio Suetaka, Kobe, all of (JP)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/553,443

(22) Filed: Apr. 19, 2000

Related U.S. Application Data

(62) Division of application No. 09/050,690, filed on Mar. 30, 1998.

(51) Int. Cl.[7] .................................................... F16K 11/02
(52) U.S. Cl. ..................................... 137/625.21; 181/230
(58) Field of Search ...................... 137/625.21, 625.22; 251/315; 181/230

(56) References Cited

U.S. PATENT DOCUMENTS

| | | | |
|---|---|---|---|
| 1,810,547 | * 6/1931 | Woods | 137/625.21 |
| 1,850,621 | * 5/1932 | Farmer | 137/625.21 |
| 3,464,449 | * 9/1969 | Morton | 137/625.21 |
| 3,674,052 | * 7/1972 | Hartman et al. | 137/625.21 |
| 3,700,006 | * 10/1972 | Marcillaud | 137/625.21 |
| 3,770,016 | * 11/1973 | Johnstone et al. | 137/625.22 |
| 3,981,378 | * 9/1976 | Potter | 181/230 |
| 4,027,698 | * 6/1977 | Weinhold | 137/625.22 |
| 4,099,543 | * 7/1978 | Mong et al. | 137/625.22 |
| 4,359,134 | * 11/1982 | Jackson | 181/230 |
| 4,548,237 | * 10/1985 | Bogenschutaz | 137/625.22 |
| 5,360,036 | * 11/1994 | Kieper | 137/625.22 |

FOREIGN PATENT DOCUMENTS

406088515 A * 5/1994 (JP) ...................................... 181/230

* cited by examiner

*Primary Examiner*—John Rivell
*Assistant Examiner*—Meredith H. Schoenfeld
(74) *Attorney, Agent, or Firm*—James Ray & Associates

(57) ABSTRACT

The present invention provides a ball cock for a railway vehicle which comprises a main body possessing a primary-side opening and a secondary-side opening which face one another and an air exhaust aperture which is formed between these openings. Such ball cock further includes a ball-shaped valve body which is rotatably provided inside such main body and in which there is formed a communication aperture which connects the primary side opening and the secondary-side opening and a side aperture which, consequent to its rotation, connects the air exhaust aperture and either the primary-side or secondary-side opening. There is formed in the main body's air exhaust aperture a pipe connection to which is be connected a restrictor. In another embodiment a extension pipe is connected to such pipe connection in such air exhaust aperture. Such pipe extension forms a bend portion which causes its opening surface to be positioned lower than a generally horizontal direction when, in accordance with the state in which the main body is fitted to a railway vehicle, its air exhaust aperture is positioned upwardly from such horizontal direction.

10 Claims, 5 Drawing Sheets

BALL COCK FOR RAILWAY VEHICLE

CROSS-REFERENCE TO RELATED APPLICATIONS

This application is a Divisional Application of co-pending patent application Ser. No. 09/050,690, filed Mar. 30, 1998.

FIELD OF THE INVENTION

The present invention relates, in general, to ball cock valves and, more particularly, this invention relates to a railway vehicle ball cock which is interposed in the air piping and related areas of a pneumatic brake device which is mainly installed below the vehicle floor in a railway vehicle.

BACKGROUND OF THE INVENTION

In a railway vehicle, pressurized air from an air source is supplied via air piping to pneumatic brake devices, air springs, automatic flap opening and closing devices and other such equipment. Ball cocks (3-way cocks) are provided in the abovementioned air piping for the purpose of repair and maintenance. A ball cock of this type is described in, for example, the disclosure of Japanese Utility Model No. 6-23802. A ball cock of this type will be described with reference to FIGS. 7–10.

The main body of a ball cock consists of a first member and a second member, inside which an inner aperture is formed and which is detachably connected to the first member. A primary-side opening and a secondary-side opening, connected to respective air pipes (not shown), are formed in opposing locations in such first and second members, respectively.

An axial aperture which communicates with the inner aperture is formed in the upper portion of the second member, and an air exhaust aperture is formed in the lower portion of such first member. Valve seat carrier elements are installed via respective seal elements at the inner sides of the primary-side opening and the secondary-side opening of the first and second members, respectively. Valve seats, made of synthetic resin, are supported by valve seat carrier elements. Further, the valve seats support a ball-shaped valve body in the inner hole in a manner such that it can rotate about a vertical axis. A plate spring is provided between the first member and the valve seat carrier element, and it pushes the valve seat to the valve body side.

A valve shaft is connected to the upper portion of the valve body, and this valve shaft passes through the axial hole and is connected to a stopper plate and a handle at the top of the second member. As shown in FIG. 9, the stopper plate has two engagement projections separated by an angle of 90 degrees. At the top of the first member there is formed a stopper which can be engaged by one or the other of the engagement projections consequent to rotation of the valve shaft of such valve body.

In valve body there is opened a communication aperture which passes horizontally through its central portion, and a side aperture which passes obliquely from one side portion of the valve body to the bottom portion. The central axis of the side aperture lies in a plane which is perpendicular to the communication aperture. In the state shown in FIG. 7, the primary side-opening and the secondary-side opening are connected via the communication aperture, but when the valve body is turned approximately 90 degrees by means of handle, the pass-through state between the primary-side opening and the secondary-side opening is cut off, and the secondary-side opening and the air exhaust aperture are connected via the side aperture and the inner aperture, as shown in FIG. 10, and thus exhaust of air from the secondary-side opening can be effected.

However, air piping in which a ball cock, as described above, is provided under the floor of a vehicle. Various types of equipment, as well as a large number of air pipes, are also suspended below this floor. Therefore, since it is necessary to avoid interference with these items, sometimes a ball cock is mounted upside-down, in order that the air exhaust aperture is located at the upper surface in a vertical direction of the ball cock, or it is mounted so that the air exhaust aperture is positioned in a horizontal direction.

If the installation is such that the air exhaust aperture is positioned horizontally or at the top surface of the ball cock, there is a problem in that it is easy for rainwater, dirt or other foreign material to penetrate into the interior of the ball cock via the air exhaust aperture and so the valve seats, as well as other parts, are subject to damage by this rainwater, dirt or other foreign matter. When this happens leakage of pressurized air from ball cock can occur. Further, since the diameter of the side aperture for exhaust of air is usually a comparatively large diameter of approximately 5 millimeters, there is also the problem that when air is exhausted from the secondary-side opening and through the side aperture, the air exhaust speed becomes too great, and thus it becomes difficult to ascertain the switching pressure of a pressure switch which is mounted on the air piping. Therefore, it becomes difficult to regulate the air pressure in the air piping at the time of air exhaust.

SUMMARY OF THE PRESENT INVENTION

The present invention provides a ball cock for a railway vehicle which comprises a main body possessing a primary-side opening and a secondary-side opening which face one another and an air exhaust aperture which is formed between these openings. Such ball cock further includes a ball-shaped valve body which is rotatably provided inside such main body and in which there is formed a communication aperture which connects the primary side opening and the secondary-side opening and a side aperture which, consequent to its rotation, connects the air exhaust aperture and either the primary-side or secondary-side opening. There is formed in the main body's air exhaust aperture a pipe connection to which is be connected a restrictor.

In another embodiment a extension pipe is connected to such pipe connection in such air exhaust aperture. Such pipe extension forms a bend portion which causes its opening surface to be positioned lower than a generally horizontal direction when, in accordance with the state in which the main body is fitted to a railway vehicle, its air exhaust aperture is positioned upwardly from such horizontal direction.

OBJECTS OF THE PRESENT INVENTION

It is, therefore, one of the primary objects of the present invention to provide a ball cock with which infiltration of rainwater, dirt or other foreign material can be minimized regardless of the mounting position of the ball cock relative to the vehicle.

Another object of the present invention is to provide a ball cock which can restrict air exhaust speed so as to be better able to measure switching pressure.

Also it is another object of the present invention to provide a ball cock which can be inexpensive to manufacture.

Still another object of the present invention is to provide a ball cock which is compatible with existing equipment.

Yet another object of the present invention is to provide a ball cock with a pipe extension which can be used in any mounting position.

In addition to the objects and advantages of the present invention which have been described above, various other objects and advantages of the ball cock will become more readily apparent to those persons who are skilled in the relevant art from the following more detailed description of the invention, particularly, when such description is taken in conjunction with the attached drawing figures and with the appended claims.

Figure 2:
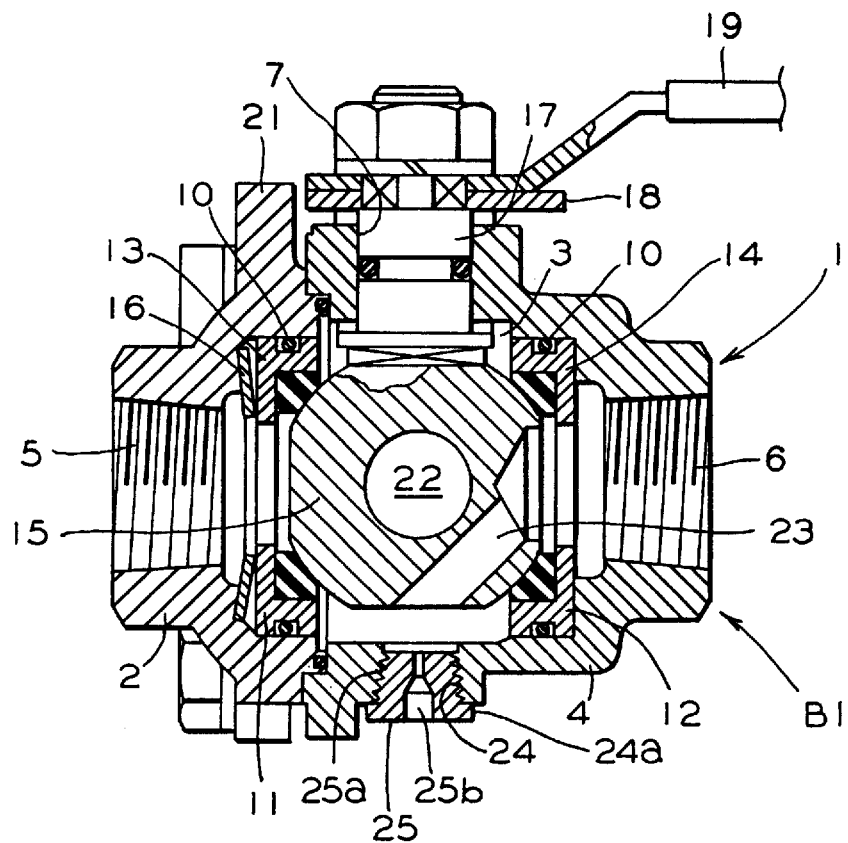
FIG. 2 is a vertical section of a ball cock showing the manner in which air exhaust is effected in a first embodiment of the invention.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

Figure 1:
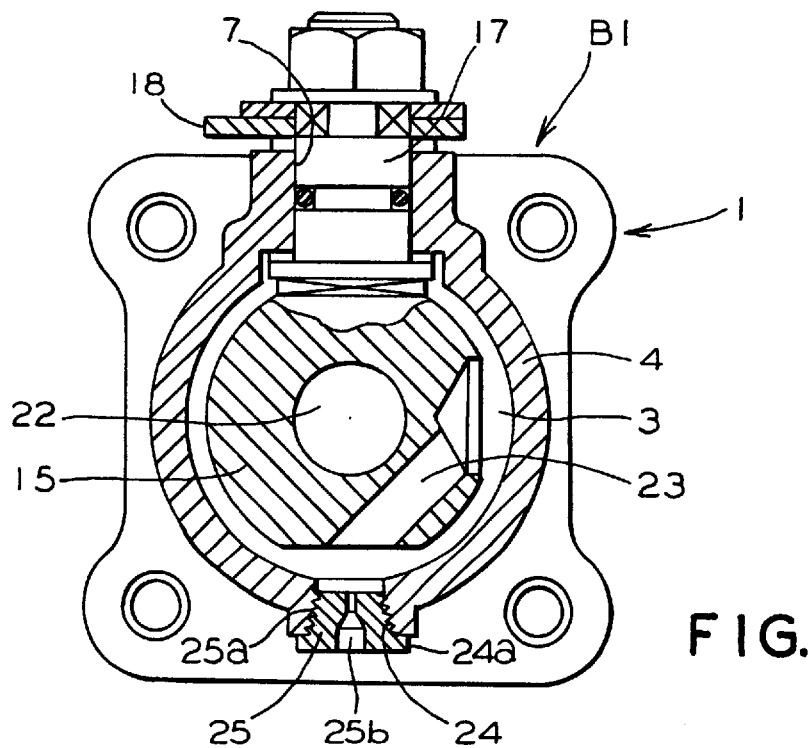
FIG. 1 is a traverse section showing a ball cock in a first embodiment of the invention.

Reference is now made, more particularly, to FIG. 1. Illustrated therein is a ball cock, generally designated B1. Ball cock B1 of this embodiment has generally the same structure as the conventional example of a prior art ball cock shown in FIGS. 7–10, and so the reference numbers are also attached to corresponding parts and a repeated description will be omitted. Ball cock B1 shown in FIG. 1 is mounted in a normal position below the floor of a vehicle, i.e., it is mounted in a manner such that the air exhaust aperture 24 is located at the lower surface. A pipe connection 24a constituted by a taper thread (taper internal thread) for a pipe is formed on the inner peripheral surface of the air exhaust aperture 24.

A restrictor 25 is screwed together with the pipe connection 24a by means of an outer-periphery taper external thread 25a, and a restriction passage 25b is formed inside this restrictor 25. With this ball cock B1, as shown in FIG. 2, when the valve body 15 is rotated 90 degrees and the secondary-side opening 6 and the side aperture 23 are connected, pressurized air in the secondary-side opening 6 passes through the side aperture 23 and the inner aperture 3, and further passes through the restrictor 25 in the air exhaust aperture 24 and is discharged. In this case, since the speed of discharge of the pressurized air is reduced by the restriction passage 25b, it is easy to ascertain the switching pressure of a pressure switch. Further, fitting the restrictor 25 to the air exhaust aperture 24 makes possible more reliable prevention of the infiltration of rainwater, dirt or other foreign matter.

Figure 3:
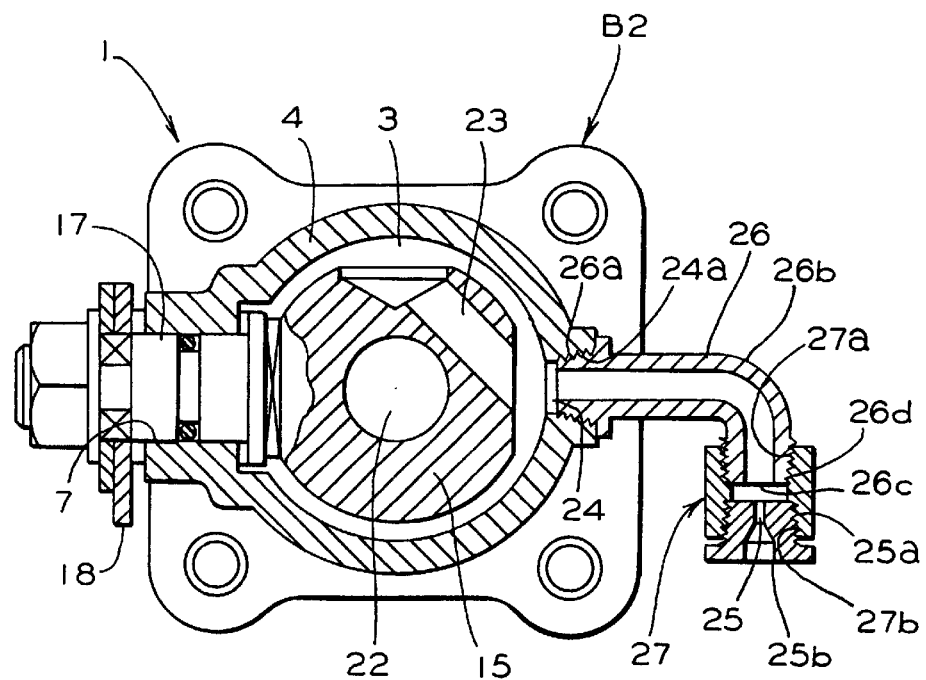
FIG. 3 is a traverse section of a ball cock in a second embodiment of the invention.

In FIG. 3 is shown a second embodiment of the invention. In this embodiment a ball cock B2 is mounted below the floor of a vehicle, not shown, in a manner such that exhaust aperture 24 is positioned in a generally horizontal direction, i.e., at a side surface of ball cock B2. An L-shaped extension pipe 26 made of metal is screwed together, by means of a taper external thread 26a provided at its base end portion, with a pipe connection 24a (taper thread for a pipe) which is provided in the air exhaust aperture 24. The opening surface 26c at the tip-end portion of the extension pipe 26, which is connected to the aforementioned base end portion via a bend portion 26b, opens facing downwards, but as long as it is positioned lower than the horizontal direction, there is a set effect in respect to restricting the infiltration of dirt or other foreign material.

A taper external thread 26d is formed at the tip-end portion of the extension pipe 26, and a first taper internal thread 27a of a pipe connection 27 is screwed together with this taper external thread 26d. Further, a restrictor 25 is screwed together with a second taper internal thread 27b of the pipe connection 27 by means of an outer-periphery taper external thread 25a. With the ball cock B2, at the time of air discharge, pressurized air is discharged to the exterior via the air exhaust aperture 24, extension pipe 26 and restrictor 25. It is not always necessary to provide the restrictor 25, and if not provided, the taper external thread 26d and the pipe connection 27 are unnecessary.

Figure 4:
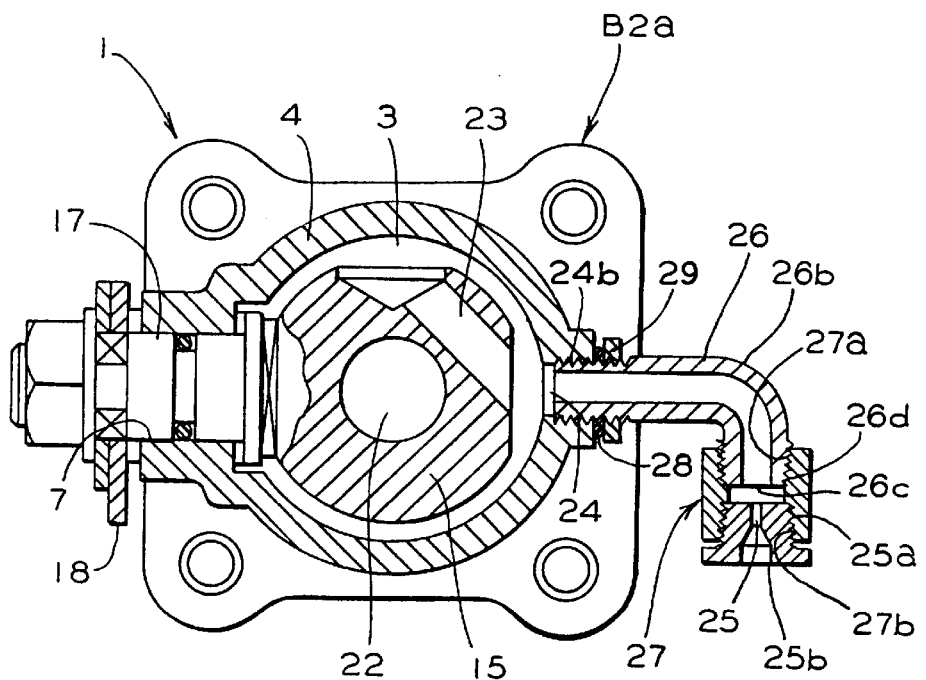
FIG. 4 is a traverse section of a ball cock showing a modification of the second embodiment of the invention.

FIG. 4 shows a modification of the second embodiment of the invention that was shown in FIG. 2. In this case, the pipe connection 24b at the inner periphery of the air exhaust aperture 24 is made a meter screw (female screw), a meter screw (male screw) 26e is also used at the base end portion of the extension pipe 26, and, if required, an O-ring 28 and a lock nut 29 are fixed to the ball cock B2a at the outer-end portion of the air exhaust aperture 24.

Figure 5:
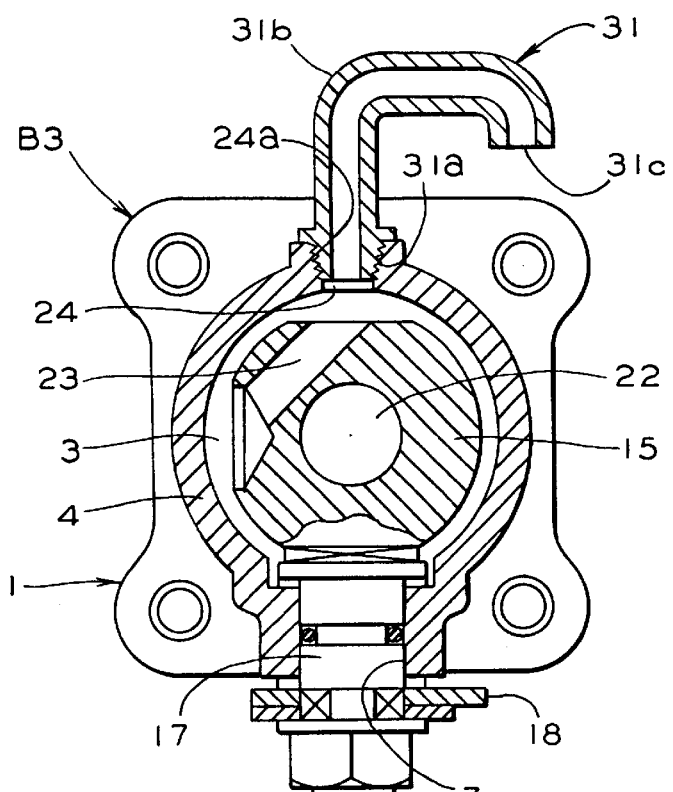
FIG. 5 is traverse section of a ball cock in a third embodiment of the invention.

FIG. 5 shows a third embodiment of the invention. The ball cock B3 of this embodiment is mounted below the floor of a railway vehicle (not shown) in a manner such that it is upside-down, i.e., such that the air exhaust aperture 24 is located at the top surface in the generally vertical direction. In this case, a U-shaped extension pipe 31 made of metal is fitted by means of a taper internal thread 31a at its base end portion to the pipe connection 24a of the air exhaust aperture 24, and the opening surface 31c of the extension pipe 31, which is connected aforementioned base end portion via a bend portion 31b, opens facing downwards. Although a restrictor 25 is not fitted in this embodiment, the arrangement may also be that a restrictor 25 is fitted to the tip-end portion of the extension pipe 31 by means of a pipe connection 27, as in the second embodiment.

Figure 6:
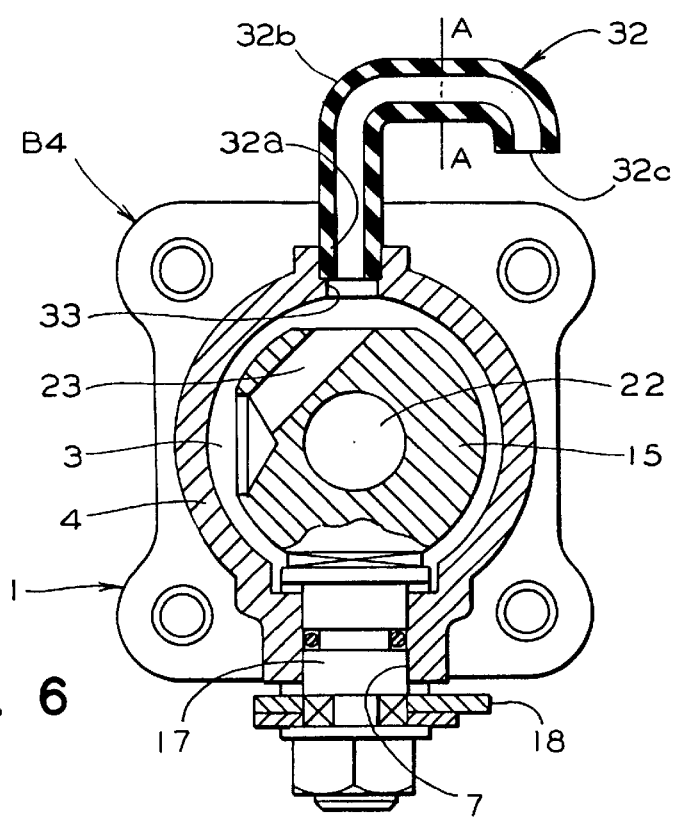
FIG. 6 is traverse section of a ball cock showing a fourth embodiment of the invention.
Figure 7:
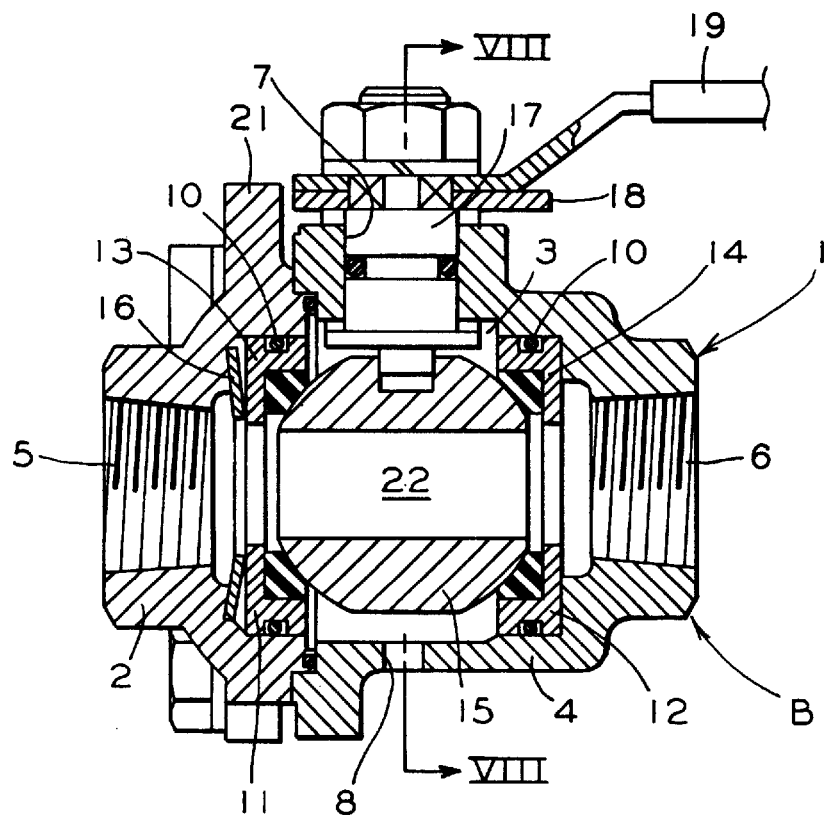
FIG. 7 is a vertical section of a ball cock showing a conventional prior art ball cock.
Figure 8:
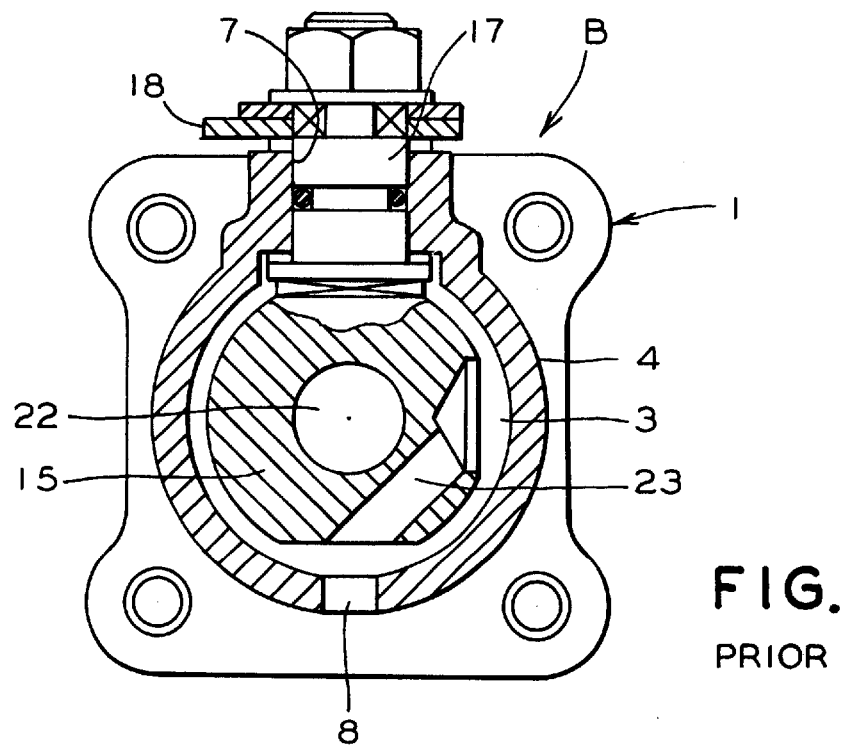
FIG. 8 is traverse section along the line VIII—VIII of the ball cock of FIG. 7.
Figure 9:
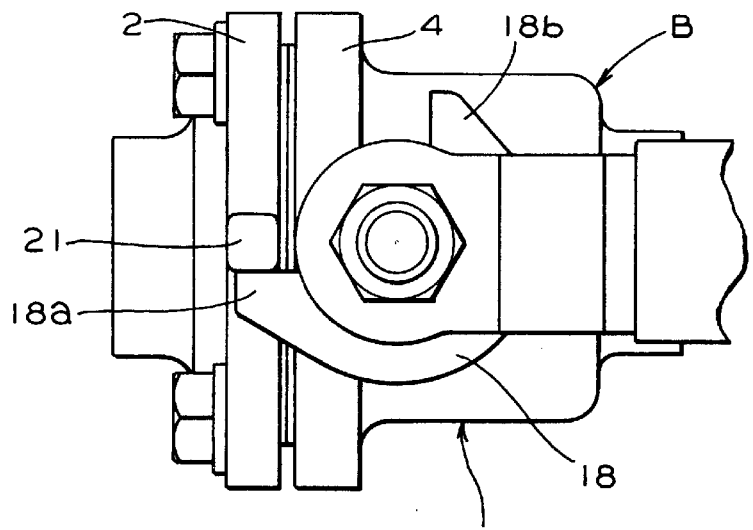
FIG. 9 is a plan view of the ball cock shown in FIG. 7.
Figure 10:
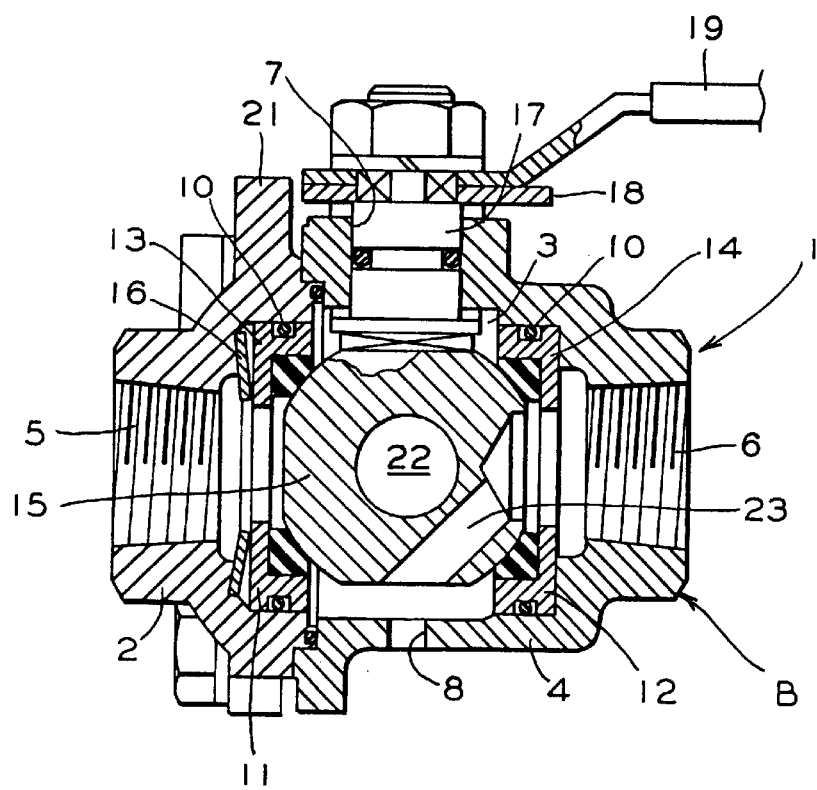
FIG. 10 is a vertical section showing the manner in which air exhaust is effected in the ball cock shown in FIG. 7.

FIG. 6 shows a fourth embodiment of the invention. In this case, a ball cock B4 is mounted in an upside-down attitude below the floor of a railway vehicle, and the base end portion 32a of a U-shaped extension pipe 32 made of hard rubber is press-fitted against the inner peripheral surface of an air exhaust aperture 33 which serves jointly as a pipe connection. The opening surface 32c at the tip-end portion of an extension pipe 32, which is connected to the abovementioned base end portion via a bend portion 32b, opens downwards. If the ball cock B4 is mounted below the floor of a railway vehicle in a manner that the air exhaust aperture 33 is directed in a horizontal direction, as in the second embodiment described previously, the extension pipe 32 can be cut at the cutting line A—A indicated by the chain-dot line and be used as an L-shaped extension pipe.

Although, in each of the embodiments described above, it was made possible to connect only the secondary-side opening 6 to the air exhaust aperture 24 via the side aperture 23 and the inner aperture 3 by making the valve body 15 free to rotate 90 degrees about the vertical axis, the arrangement may also be made such that both the primary-side opening 5 and the secondary-side opening 6 can be connected to the air exhaust aperture 24 via the side aperture 23 and inner aperture 3 and air can be discharged from both the primary-side opening 5 and the secondary-side opening 6 by making the valve body 15 free to rotate 90 degrees about the vertical axis.

As described above, the railway vehicle ball cock of the first embodiment of the invention is one which comprises a main body possessing a primary-side opening and a secondary-side opening which face one another and an air exhaust aperture which is formed between these openings. There is a ball-shaped valve body which is rotatably provided inside this main body and in which there is formed a communication aperture which connects the primary-side opening and the secondary-side opening and a side aperture which, consequent to its rotation, connects the air exhaust aperture and either the primary-side opening or the secondary-side opening. There is formed in the main body's air exhaust aperture a pipe connection to which can be connected an extension pipe that forms a bend portion which causes its opening surface to be positioned lower than a generally horizontal direction when, in accordance with the state in which the main body is fitted to a railway vehicle, its air exhaust aperture is positioned upwardly of a horizontal direction. Therefore, when the ball cock is mounted in a manner such that the air exhaust aperture is positioned upwardly of a general horizontal direction, the opening surface of the extension pipe can be positioned lower than this horizontal direction by connecting the extension pipe to the pipe connection of the air exhaust aperture. As a result, regardless of the ball cock's mounting attitude relative to the vehicle, there is less infiltration of rainwater, dirt or other foreign material via the air exhaust aperture and thus it is more difficult for problems that could damage the ball cock to occur.

Since the railway vehicle ball cock of the second embodiment of the invention is one in which, the pipe connection is formed by a taper with pipe threads, connection of the extension pipe to the pipe connection can be effected more surely and firmly by connecting to the pipe connection the taper thread which is formed at the end portion of the extension pipe.

The ball cock for a railway vehicle in a third embodiment is one in which the extension pipe possesses an L-shaped extension pipe which can be fitted when the air exhaust aperture is positioned in a generally horizontal direction and a U-shaped extension pipe which can be fitted when the air exhaust aperture is positioned at the upper surface in the generally vertical direction. Therefore, by using extension pipes which have different shapes in accordance with the position of the air exhaust aperture, it is possible to position the extension pipe opening lower than the horizontal direction, regardless of what the air exhaust aperture's position is.

In a fourth embodiment, the railway vehicle ball cock is one in which the extension pipe is formed to a U-shape with hard rubber, and a portion thereof can be cut off to form an L-shaped extension pipe. That is, only one type of U-shaped element formed from hard rubber is prepared for the extension pipe. If the air exhaust aperture is located at the top of the ball cock, this U-shaped extension pipe is used just as it is. However, if the air exhaust aperture is positioned in the horizontal direction, an L-shaped extension pipe can be produced by cutting the U-shaped extension pipe in two at a generally central location and this can be connected to the air exhaust aperture. There is, therefore, the advantage that the extension pipe specification can be unified as a single form of specification and the cost of the extension pipe manufacture can be reduced.

Since the railway ball cock of the fifth embodiment is one in which a restriction passage is formed in the main body's air exhaust aperture or in the extension pipe, the speed of discharge of air from the air exhaust aperture is reduced and sharp discharge of air from air piping is suppressed, and as a result it is easy to ascertain the switching pressure of a pressure switch which is mounted on the air piping.

It will be understood that various alterations and changes may be made by those skilled in the art without departing from the spirit and scope of the subject invention. Therefore, it will be appreciated that certain modifications, ramifications, and equivalents will be readily apparent to persons skilled in the art, and accordingly, it is understood that the present invention should not be limited to the exact embodiments shown and described, but should be accorded the full scope and protection of the appended claims.

We claim:

1. A ball cock valve for a railway vehicle, said ball cock valve comprises:
   (a) a main body portion possessing a primary-side opening and a secondary-side opening which face one another and an air exhaust aperture formed between said primary-side opening and said secondary-side opening, said air exhaust aperture being threaded;
   (b) a ball-shaped valve body rotatably disposed inside a cavity formed in said main body portion, said ball-shaped valve body having a communication aperture formed therein which connects said primary-side opening and said secondary-side opening and a side aperture which, consequent to its rotation, connects said air exhaust aperture and one of said primary-side opening and said secondary-side opening; and
   (c) an extension pipe having a threaded first end connected at said first end thereof to said air exhaust aperture, said extension pipe having a restrictor means connected to a second end thereof.

2. A ball cock valve for a railway vehicle, according to claim 1, wherein said extension pipe is selected from a group consisting of metal, plastic and hard rubber.

3. A ball cock valve for a railway vehicle, according to claim 2, wherein said extension pipe is metal.

4. A ball cock valve for a railway vehicle, according to claim 3, wherein said extension pipe is substantially L-shaped when said air exhaust aperture is positioned in a generally horizontal direction.

5. A ball cock valve for a railway vehicle, according to claim 3, wherein said extension pipe is generally U-shaped when said air exhaust aperture is positioned in a generally vertical direction at an upper surface of said main body portion.

6. A ball cock valve for a railway vehicle, according to claim 1, wherein said extension pipe is substantially L-shaped when said air exhaust aperture is positioned in a generally horizontal direction.

7. A ball cock valve for a railway vehicle, according to claim 1, wherein said extension pipe is generally U-shaped when said air exhaust aperture is positioned in a generally vertical direction at an upper surface of said main body portion.

8. A ball cock valve for a railway vehicle, according to claim 1, wherein said extension pipe is substantially L-shaped when said air exhaust aperture is positioned in a generally horizontal direction.

9. A ball cock valve for a railway vehicle, according to claim 1, wherein said extension pipe is generally U-shaped when said air exhaust aperture is positioned in a generally vertical direction at an upper surface of said main body portion.

10. A ball cock valve for a railway vehicle, according to claim 1, wherein said restrictor means is threadably connected to said second end of said extension pipe.

\* \* \* \* \*